UNITED STATES PATENT OFFICE.

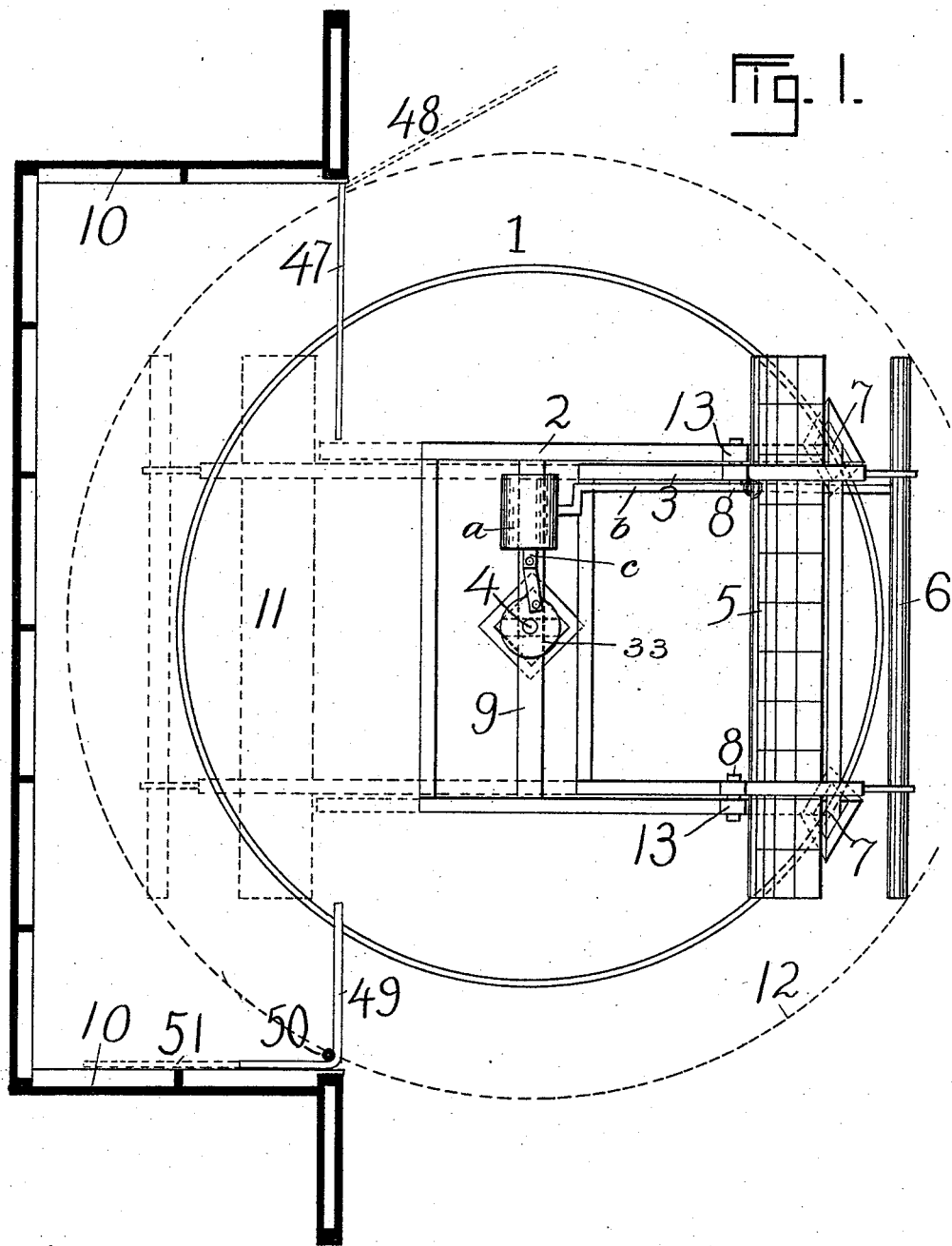

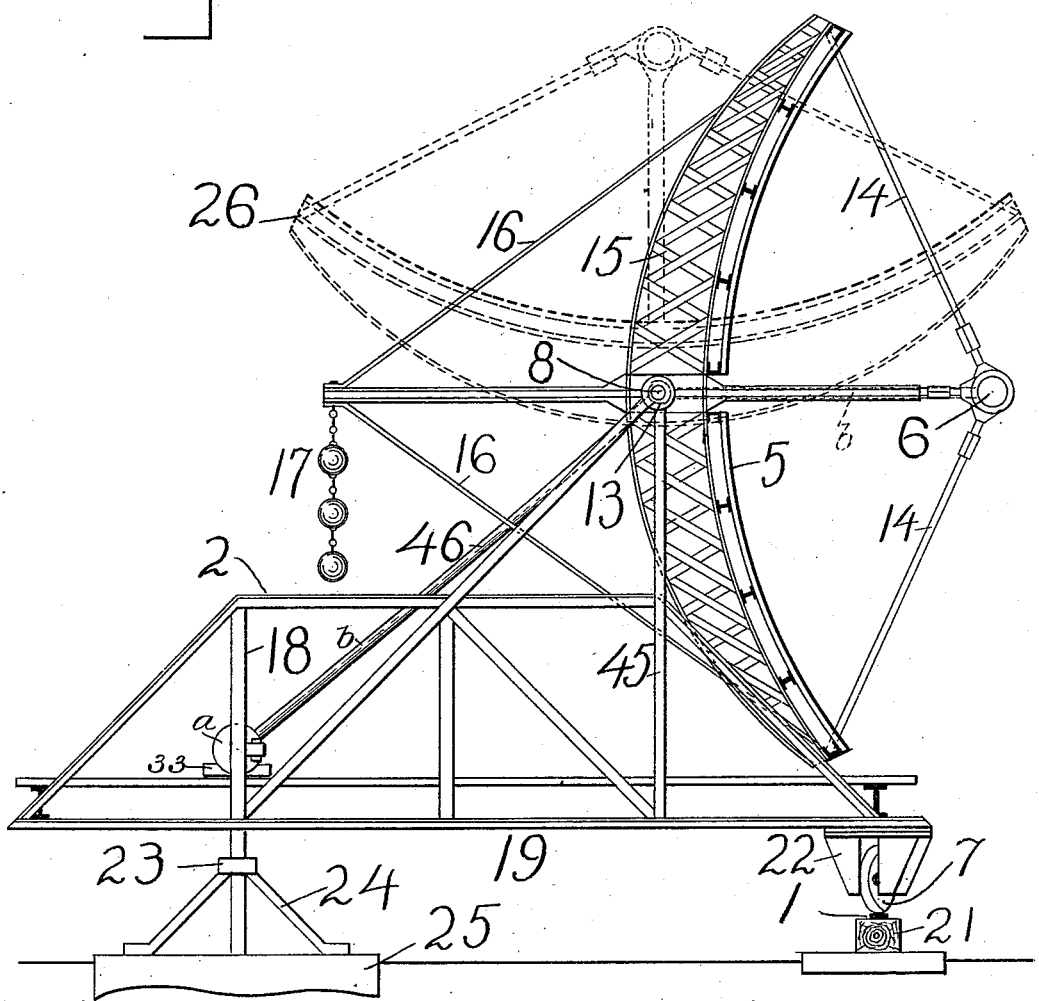

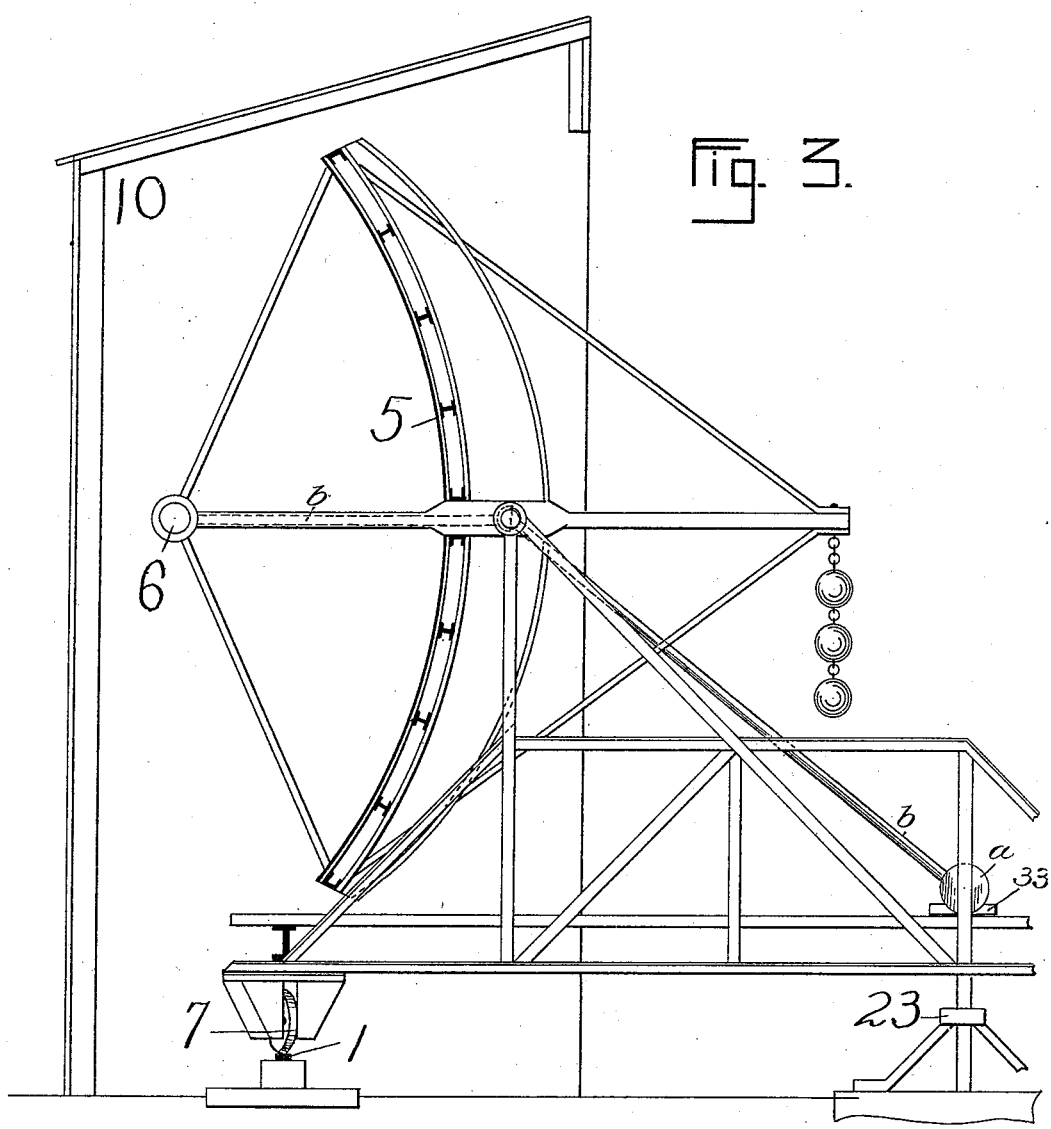

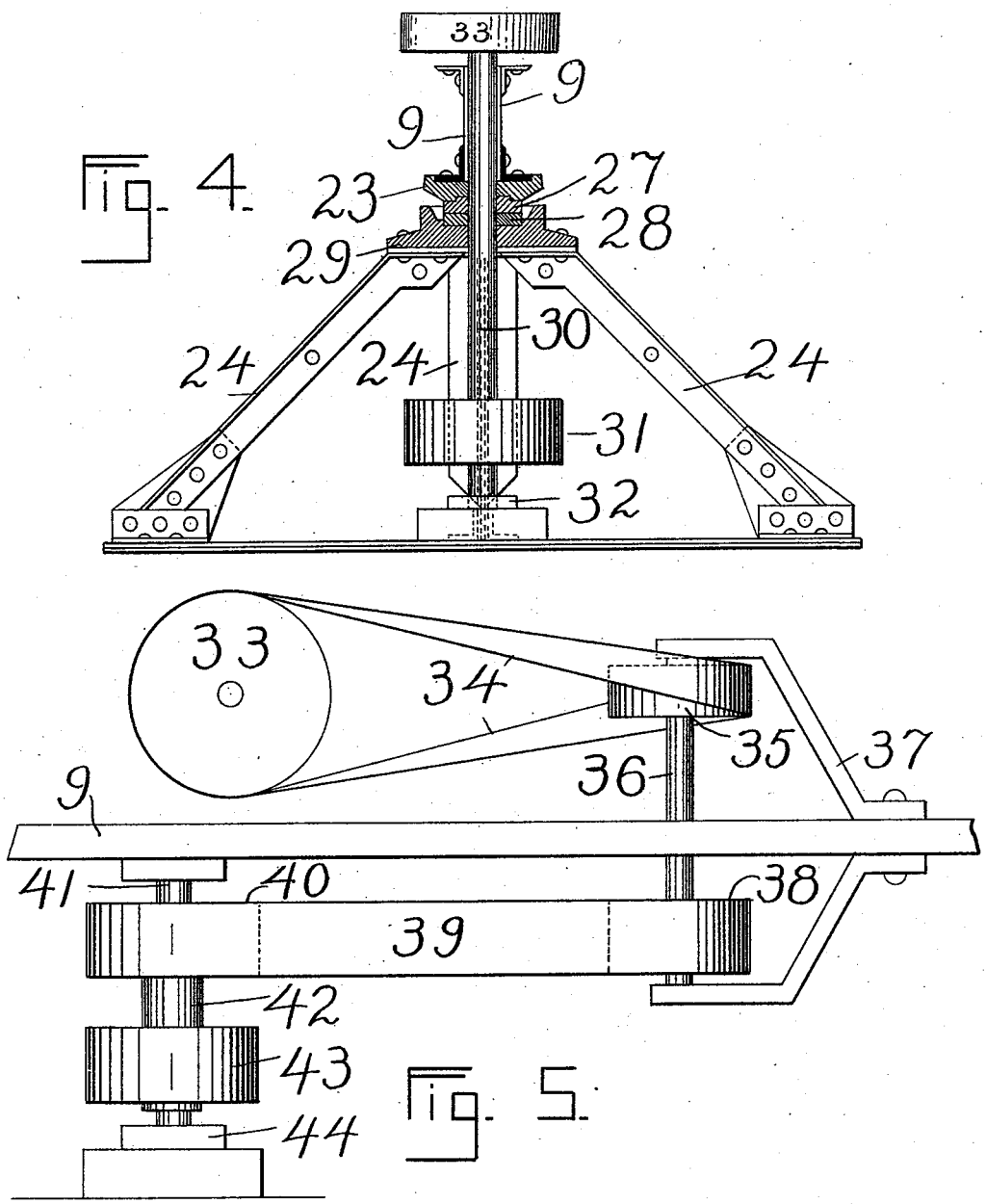

FRANK H. MONKS, OF BROOKLINE, AND MELVIN L. SEVERY, OF BOSTON, ASSIGNORS TO FRANCIS DOANE, CHARLES F. CROWELL, AND MELVIN L. SEVERY, TRUSTEES, OF BOSTON, MASSACHUSETTS.

APPARATUS FOR UTILIZING SOLAR ENERGY.

SPECIFICATION forming part of Letters Patent No. 528,255, dated October 30, 1894.

Application filed May 5, 1893. Serial No. 473,152. (No model.)

*To all whom it may concern:*

Be it known that we, FRANK H. MONKS, residing at Brookline, in the county of Norfolk, and MELVIN L. SEVERY, residing at Boston, in the county of Suffolk, State of Massachusetts, citizens of the United States, have invented certain new and useful Improvements in Apparatus for Utilizing Solar Energy, of which the following, taken in connection with the accompanying drawings, is a specification.

This invention relates to that form of apparatus for utilizing solar heat in which there is a boiler or other heat receiver fixed in the focus of a reflector, and means for moving said reflector and heat receiver, both in a vertical and in a horizontal plane, whereby the reflector and heat receiver are constantly maintained opposite to the sun in accordance with the apparent diurnal movement of the sun and its movement in the ecliptic; and the invention has for its object the production of a simple, practical and easily operated apparatus from which power can be taken while in motion, and which will be well protected when not in use.

To this end, the invention is embodied in the combination, substantially as hereinafter more fully set forth, of a turn-table moving upon a circular track; a frame upon said turn-table; a device for concentrating solar rays pivoted upon said frame so as to be capable of a movement in a vertical plane; a boiler or other heat receiver suitably supported in the focus of the concentrating device; means whereby power can be taken from the axis of the turn-table, and a structure to serve as a shelter or housing, having one of its sides on a line at right angles to the meridian line and opposite to the sun, that side being adapted to be opened and closed by doors or curtains. This shelter covers a segment of the track to such an extent as to be capable of receiving and inclosing the concentrator and heat receiver when they are not in use, and to protect the concentrating device from the injurious effects of unfavorable weather, exposure to which would impair or destroy its efficiency.

This apparatus is represented in the accompanying drawings, in which—

Figure 1 is a plan view. Fig. 2 is a view in elevation of the turn-table, frame, reflector, heat receiver and motor. Fig. 3 is another elevation of the device, showing the reflector and heat receiver turned into the shelter or housing and protected thereby. Fig. 4 is a view in vertical section of one means for taking power from the center of the turn-table. Fig. 5 is a view in elevation of another means for accomplishing the same result.

In the several figures, the same numerals and letters refer to the same parts.

Referring to the figures, 1 is a circular track suitably supported upon beams and ties of wood or other suitable material. At the center of the circle formed by this track, a turn-table is pivoted, and on this track the turn-table moves. This turn-table, which is pivoted at 4 is preferably constructed in the form of a frame composed of the side bars 2, the longitudinal base bar 19, the vertical bars 18 and 45, the inclined brace bars 46 and the cross bar 9. These bars may be made of the ordinary "T" iron, or of any other suitable construction. Upon the lower side of the outer end of the bars 19 are lugs 22, in which are supported wheels 7, which travel upon the track 1, and upon the upper end of the bars 45 are nuts 13, in which are horizontal pins 8. Upon these pins is pivoted the frame 3 which supports the reflector so that the latter is made capable of movement in a vertical plane. This reflector is shown at 5, and may be made in any suitable manner. It may be mounted upon a frame which is strengthened by means of trusses 15 placed behind the same. 5 is the heat receiver placed in the focus of the reflector, and supported in this position by means of the rods 14 which extend respectively from the top and bottom of the reflector frame. Rods 16 also extend respectively from the top and bottom of the reflector frame to the rear end of the frame 3, and serve as braces to support the reflector.

The reflector and heat receiver are balanced by a suitable counter-poise 17 attached to the rear end of the frame 3.

The form of the reflector and the form of the heat receiver constitute no part of this invention, as any suitable form may be used.

It is obvious that the movement of the reflector in a vertical plane, in connection with the movement of the turn-table in a horizontal plane, insures the opposition of the reflector to the sun at all times during the day, and at all seasons of the year. The movement necessary to accomplish this result may be effected by hand, or it may be effected automatically by suitable mechanism, as in the apparatus described in United States Letters Patent No. 495,163, granted to Melvin L. Severy April 11, 1893.

The form of motor shown is a steam engine. $a$ is its cylinder; $b$, a pipe leading from the heat receiver or boiler 6 and connecting with the steam chest of the engine, and $c$ the piston rod connected with the driving wheel 33.

In order that the power obtained may be more completely utilized and with the best results the motor to be operated thereby is placed on the turn-table so as to bring it near to and to have it at all times the same distance from the receiver; and further to avoid any irregularity or defect in transmitting the power to points away from the turn-table a part of the mechanism is placed at the axis of the turn-table and through this part the power is communicated to the desired point.

In Fig. 4 of the drawings, 30 is a vertical shaft upon which are placed the driving wheels 31, 33 to be operated by the engine upon the turn-table. This shaft passes through the beam 9, and turns freely in it. To the lower side of this beam is suitably secured a plate of metal which bears upon another plate of metal 27, secured by a casting 28 to a block 29 supported by the braces 24. In the movement of the turn-table, the plate 23 turns freely upon the plate 27, and these plates are adopted in order to secure an even bearing. Other devices, however, may be used. Upon the shaft 30, is a pulley 31, by which connection is made with the mechanism outside of the turn-table.

Another device for taking the power from the turn-table is shown in Fig. 5, in which 33 represents the driving wheel of the engine or motor placed upon the turn-table, and 36 is a vertical counter-shaft which passes through the cross beam 9, and this shaft is suitably supported by brackets 37, extending from the upper and lower sides of the beam 9. To the bar 9 is secured the vertical rod 41, on which are two pulleys 40 and 43, connected by a sleeve 42, which turns upon the rod 41. A pulley 35 upon the counter-shaft is connected by a belt 34 to the driving wheel 33, and a pulley 38 on the other end of the counter-shaft is connected by a belt 39 with the pulley 40. The pulley 43 is connected to the mechanism outside of the track.

In order that an apparatus of the class described for utilizing solar heat may be of substantial commercial value, it must be maintained at its highest efficiency for a considerable time, and be suitable for permanent use. The concentrators employed in such apparatus and in the particular form of apparatus herein described, are of such a character that unless they can be protected from the destructive effects of unfavorable and stormy weather, their efficiency will soon become greatly diminished, if not entirely destroyed. It is also desirable that the concentrator should be covered during the night and at other times when not required for use, to save the labor required for cleaning the polished surfaces. As an important element, therefore, in the practical value and utility of the apparatus herein described, it has been found necessary to combine with the same a shelter or covering which will afford the requisite protection to the concentrator and other parts of the device, and within which they may be placed and inclosed at any desired time. This shelter must be so situated as not to interfere with the effect of the sun's rays upon the concentrator, and it is therefore placed with its front or open side facing the sun and on a line at right angles to the meridian line. Its width and depth must be sufficient to inclose such a segment of the circular track that when the concentrator and heat receiver are turned into it, they will be completely inclosed as shown in Figs. 1 and 3. The open front may be closed by curtains or by suitable doors, which may either be folding doors, as shown at 47 and 48, or sliding doors, as shown at 49, 50 and 51, Fig. 1.

The form and mode of construction of the shelter are immaterial, provided it is adapted to receive and completely inclose the parts of the apparatus that are liable to the injuries above stated.

Having thus described our invention, what we claim, and desire to secure by Letters Patent of the United States, is—

1. In an apparatus for utilizing solar energy, the combination of a turn-table, a heat receiver, a device arranged to direct rays upon said receiver, a motor to be operated by the power obtained by the receiver, and means connecting the receiver and motor for transmitting the said power to the motor, all of said devices being on the turn-table, substantially as set forth.

2. In an apparatus for utilizing solar energy, the combination of a turn-table, a heat receiver, a device for directing rays upon said receiver, a motor, all of said devices being on the turn-table, and means located at the axis of the turn-table for transmitting power from said motor, substantially as described.

3. In an apparatus for utilizing solar energy, the combination of a turn-table, a heat receiver, a device for directing rays upon said receiver, a motor, all of said devices being on the turn-table, a shaft rotatable at the axis and independently of the turn-table, and means for transmitting motion from the motor to the shaft, substantially as described.

4. The combination of a turn-table; a motor on said turn-table; a shaft at the axis of said turn-table; a pulley on said shaft, and means for connecting said pulley to the motor and to the mechanism operating outside of the turn-table, substantially as set forth.

5. The combination of a turn-table; a motor on said turn-table; a vertical shaft around which said turn-table rotates; a pulley on said shaft connected to the motor; a rotating horizontal bearing plate attached to a cross beam of the turn-table and having the shaft passing through the plate; and a suitably supported horizontal fixed plate on which the bearing plate rotates, substantially as set forth.

6. In an apparatus for utilizing solar energy, the combination of a turn-table; a solar heat concentrating device and a heat receiver suitably supported on said turn-table; a shelter or housing so situated as to be in the rear of the concentrator when the latter is in use, having one of its sides on a line at right angles to the meridian line, open on that side but closed on the other sides, and covering a segment of the path of the turn-table to such an extent that the heat receiver and concentrator will be completely inclosed when turned back into the shelter, and means for closing the open side, substantially as set forth.

7. In an apparatus for utilizing solar energy, the combination of a turn-table; a solar ray concentrating device upon said turn-table; suitable framework supporting and carrying said concentrating device, and a shelter or housing adapted to receive, inclose and preserve the efficiency of said concentrating device, all substantially as shown and described.

8. In an apparatus for utilizing solar energy, the combination of a turn-table; a fixed frame on said turn-table; a frame pivoted to said fixed frame and capable of moving in a vertical plane; a concentrator and heat receiver supported by said pivoted frame, and a counter-balance on said frame, substantially as set forth.

In testimony whereof we have hereunto subscribed our names this 2d day of May, A. D. 1893.

FRANK H. MONKS.
MELVIN L. SEVERY.

Witnesses:
CHAS. A. KELLOGG,
E. H. GRANGER.